United States Patent [19]

Higurashi

[11] Patent Number: 4,752,832
[45] Date of Patent: Jun. 21, 1988

[54] VIDEO AND AUDIO SIGNAL RECORDING AND/OR REPRODUCING APPARATUS

[75] Inventor: Seiji Higurashi, Chiba, Japan

[73] Assignee: Victor Company of Japan, Ltd., Japan

[21] Appl. No.: 890,828

[22] Filed: Jul. 25, 1986

[30] Foreign Application Priority Data

Jul. 30, 1985 [JP] Japan .................. 60-168437

[51] Int. Cl.⁴ ........................................... H04N 5/782
[52] U.S. Cl. .................... 358/310; 358/330; 358/341; 358/343; 360/19.1
[58] Field of Search ............... 358/310, 341, 343, 330; 360/19.1, 33.1, 39, 40, 48

[56] References Cited

U.S. PATENT DOCUMENTS 4,672,473 6/1987 Sugiyama ........................... 358/341

Primary Examiner—Robert L. Richardson
Attorney, Agent, or Firm—Andrus, Sceales, Starke & Sawall

[57] ABSTRACT

A video and audio signal recording apparatus comprises a video block, a digital audio signal producing circuit, a modulating circuit for generating an n-value frequency modulated signal, where n is an integer greater than or equal to three, and a recording circuit for recording the n-value frequency modulating signal and a frequency division multiplexed signal from the video block. A video and audio signal recording and reproducing apparatus comprises a first video block, a digital audio signal producing circuit, a modulating circuit for generating an n-value frequency modulated signal, a recording and reproducing circuit, first and second demodulating circuits, a decoder, and a second video block for obtaining a reproduced video signal.

11 Claims, 3 Drawing Sheets

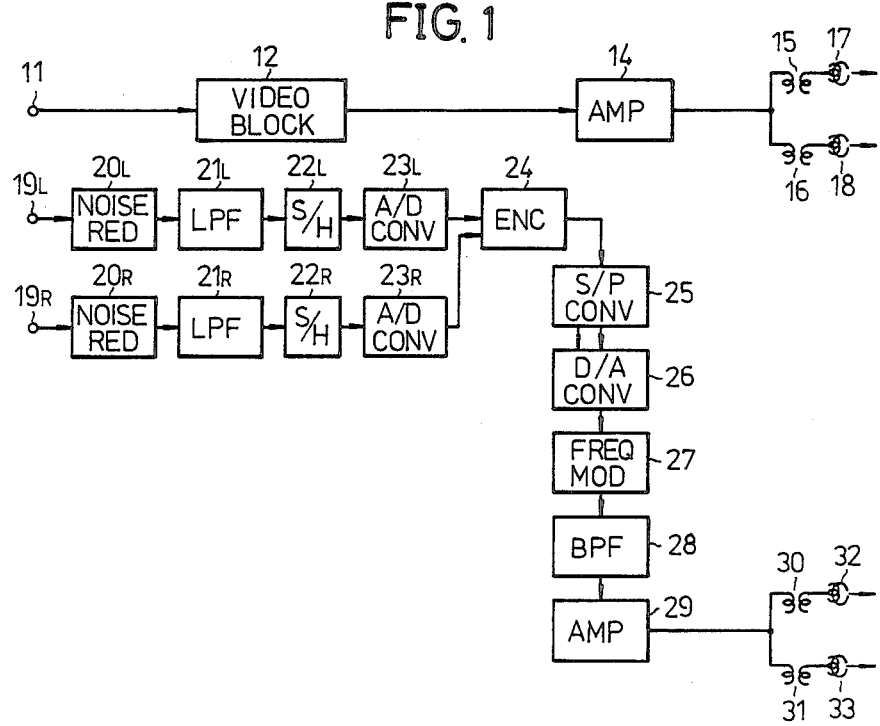
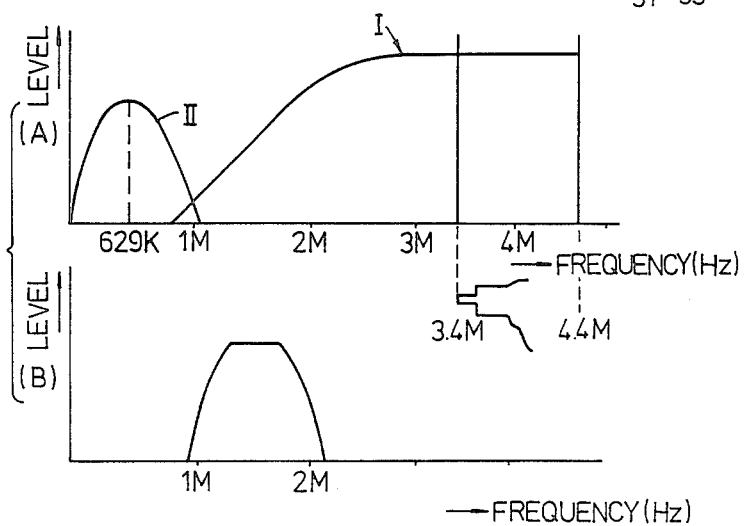

FIG. 3
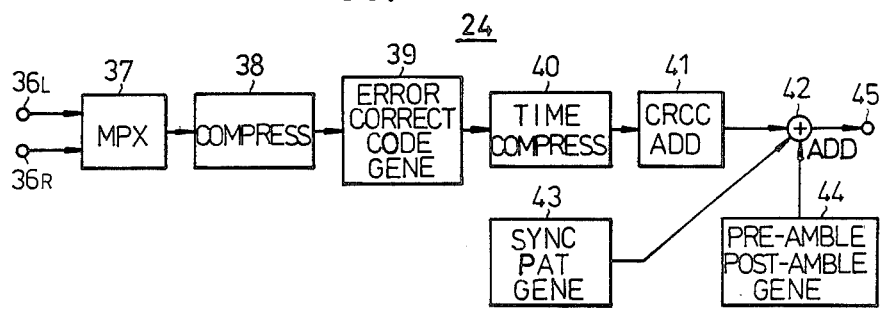
FIG. 4
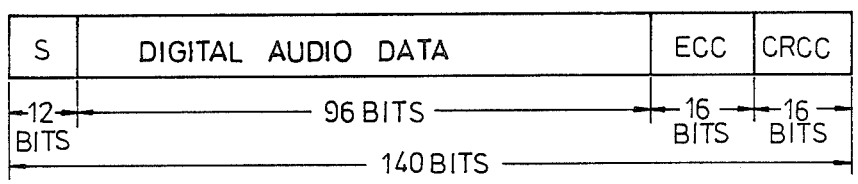
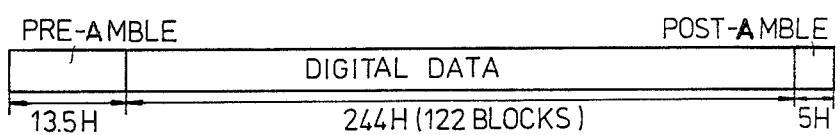
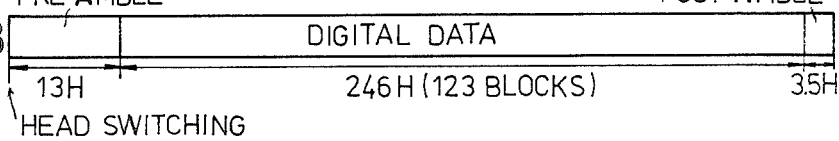

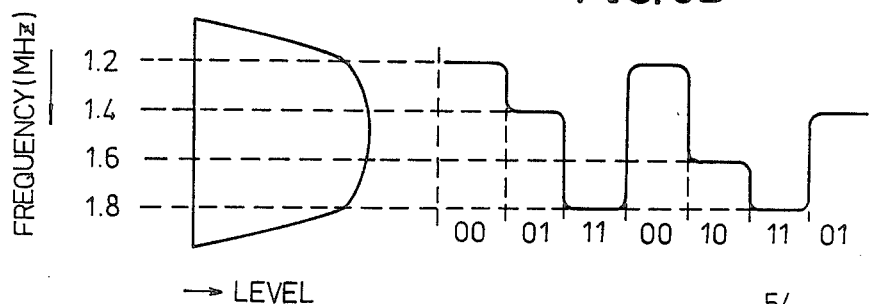
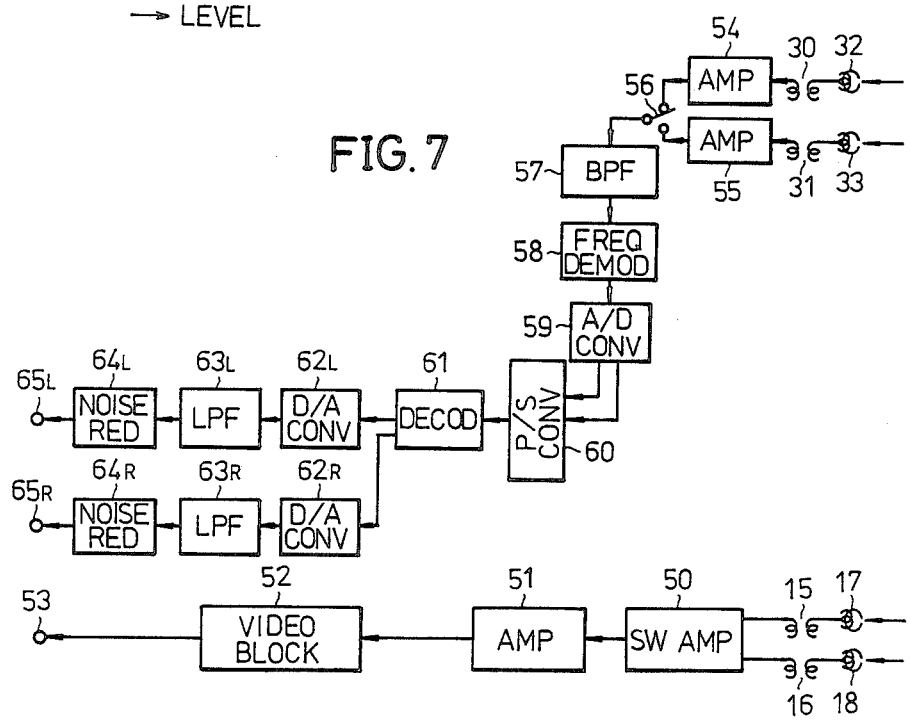
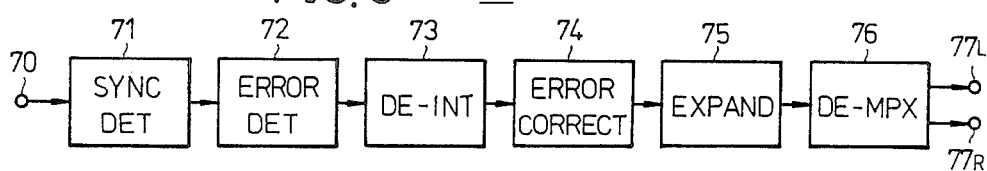

VIDEO AND AUDIO SIGNAL RECORDING AND/OR REPRODUCING APPARATUS

BACKGROUND OF THE INVENTION

The present invention generally relates to video and audio signal recording and/or reproducing apparatuses, and more particularly to a recording and/or reproducing apparatus for recording and/or reproducing on and/or from a magnetic tape which is transported a frequency modulated audio signal together with a frequency division multiplexed signal comprising a frequency modulated luminance signal and a frequency converted carrier chrominance signal which has been frequency-converted into a low frequency range, by use of rotary magnetic heads mounted at mutually opposing positions on a rotary body to which the magnetic tape is wrapped obliquely for a predetermined angular range.

Presently, in a helical scan type magnetic recording and/or reproducing apparatus (hereinafter simply referred to as a video tape recorder or VTR) for home use employing a magnetic tape having a width of ½ inch, the so-called low band conversion color recording and reproducing system is employed because the recording and reproducing frequency band is relatively narrow. According to this low band conversion color recording and reproducing system, a luminance signal separated from a color video signal is frequency-modulated, and a carrier chrominance signal separated from the color video signal is frequency-converted into a frequency band lower than a frequency band of the frequency modulated luminance signal. The frequency modulated luminance signal and the frequency converted carrier chrominance signal are frequency-division-multiplexed to obtain a frequency division multiplexed signal, and this frequency division multiplexed signal is recorded on and reproduced from the magnetic tape. In order to improve the tape utilization efficiency, rotary magnetic heads which record two mutually adjacent tracks have gaps of mutually different azimuth angles so that the tracks can be formed without a guard band therebetween. Furthermore, in order to record and reproduce audio signals with a high quality, there is a conventional VTR which records and reproduces a frequency modulated (FM) audio signal or a pulse code modulated (PCM) audio signal.

However, although the FM audio signal can be transmitted within a narrow frequency band, the phases of reproduced FM audio signals from the rotary heads at a joint portion where the switching of the rotary heads takes place do not coincide perfectly due to differences in the tape tension and the like. As a result, there are problems in that the phase of the reproduced FM audio signal changes at the joint portion and pulse noise corresponding to the change in the phase is generated in a demodulated signal which is obtained by demodulating the reproduced FM audio signal. For this reason, it is necessary to provide a noise reduction circuit for reducing the pulse noise. In addition, since the FM audio signal is an analog signal, the quality of the signal becomes greatly deteriorated when a dub-recording is carried out.

On the other hand, in the case of the PCM audio signal, horizontal and vertical blanking periods are provided and the undesirable effects of the switching of the rotary heads are avoided. Furthermore, in the case of a stereo audio signal, right and left channel audio signals are respectively pulse code modulated and subjected to a time base compression, and PCM audio signals of the right and left channels are recorded time divisionally. Hence, it is possible to avoid transmission during the switching of the rotary heads, and the change in the phase during the switching of the rotary heads can be neglected. Moreover, because the PCM audio signal is a digital signal, the deterioration in the quality of the signal is extremely small when the dub-recording is carried out. Accordingly, in order to record and reproduce the audio signals with a high quality, it is desirable to record the audio signals in the signal format of the PCM audio signal.

However, the frequency spectrum becomes wide when the PCM audio signal is recorded directly on a recording medium, but the error rate becomes high when the frequency band of the PCM audio signal is limited to a predetermined frequency band and it is disadvantageous to transmit within a narrow frequency band. On the other hand, as known systems for transmitting the PCM audio signal having a narrow frequency band, there are the quaternary phase shift keying (QPSK) and the quaternary differential phase shift keying (QDPSK). These known systems enable transmission within a narrow frequency band, but require demodulation of the carrier in a reproducing system. Thus, in the case of the reproduced signal from the VTR including a time base deviation component (jitter), there is a problem in that the circuit construction of the reproducing system becomes complex.

SUMMARY OF THE INVENTION

Accordingly, it is a general object of the present invention to provide a novel and useful video and audio signal recording and/or reproducing apparatus in which the problems described heretofore are eliminated.

Another and more specific object of the present invention is to provide a video and audio signal recording and/or reproducing apparatus in which digital audio data obtained by pulse code modulating an analog signal is added with redundant bits and subjected to a digital-to-analog conversion so as to to obtain an n-value analog signal, where n is greater than or equal to three, and an n-value (multi-frequency) frequency modulated signal obtained by frequency-modulating a carrier by the n-value analog signal is supplied to rotary heads which also record a frequency division multiplexed signal of a frequency modulated luminance signal and a frequency converted carrier chrominance signal or to rotary heads which lead the rotary heads which record the frequency division multiplexed signal, so as to record the n-value frequency modulated signal. At the time of a reproduction, the n-value frequency modulated signal obtained from output reproduced signals of the rotary heads is demodulated into a demodulated signal, and the demodulated signal is subjected to an analog-to-digital conversion and is thereafter decoded so as to obtain a reproduced analog audio signal.

According to the recording and/or reproducing apparatus of the present invention, it is possible to obtain a reproduced audio signal of high fidelity and high quality without being affected by the noise generated when the switching of the rotary heads takes place. In addition, compared to a frequency modulated audio signal which is obtained by frequency-modulating a carrier directly by the analog audio signal, it is possible to carry out a dub-recording with an extremely low deterioration in the signal quality, and the recording and reproduction can be carried out within a narrow frequency band. Furthermore, compared to a PSK modulated signal and a DPSK modulated signal, the n-value frequency modulated signal is less affected by the time base deviation (jitter). Since the redundant bits such as the error correction codes are added at the time of the recording, a transmission error is unlikely to occur even when the present invention is applied to the recording and reproducing systems of the VTR having large jitter. Even if a transmission error should occur, it is possible to correct such error. The capacity of the transmission path is used to the limit when recording the PCM signal in a baseband, and it is efficient to use the recording and reproducing frequency characteristic to the limit. Accordingly, when the upper limit portion of the frequency characteristic is used, it is impossible to perform the multi-value (multi-level) transmission because the dynamic range is small in the upper limit portion. But according to the present invention, it is possible to transmit the PCM signal by use of the intermediate portion of the recording and reproducing frequency band, and it is possible to efficiently perform the multi-value transmission since there is a margin in the dynamic range.

Other objects and further features of the present invention will be apparent from the following detailed description when read in conjunction with the accompanying drawings.

BRIEF DESCRIPTION OF THE DRAWINGS

FIG. 1 is a system block diagram showing an embodiment of the video and audio signal recording apparatus according to the present invention;

FIGS. 2(A) and 2(B) respectively show frequency spectrums of a frequency division multiplexed signal and a frequency modulated audio signal which are recorded and reproduced in the recording and/or reproducing apparatus according to the present invention;

FIG. 3 is a system block diagram showing an example of an encoder in the block system shown in FIG. 1;

FIG. 4 shows an embodiment of a signal format of one block of an audio signal which is recorded in the recording and/or reproducing apparatus according to the present invention;

FIGS. 5A and 5B, respectively show examples of a signal format of a digital audio signal which is recorded on one track of a magnetic tape;

FIGS. 6A and 6B respectively show examples of a frequency spectrum of a 4-value (quaternary) frequency modulating signal and a 4-value frequency modulated signal;

FIG. 7 is a system block diagram showing an embodiment of the video and audio signal reproducing apparatus according to the present invention; and FIG. 8 is a system block diagram showing an example of a decoder in the block system shown in FIG. 7.

DETAILED DESCRIPTION

First, description will be given with respect to the video and audio signal recording apparatus according to the present invention. FIG. 1 shows an embodiment of the recording apparatus according to the present invention. In FIG. 1, a color video signal applied to an input terminal 11 is supplied to a video block 12 wherein the color video signal is converted into a frequency division multiplexed signal. In the video block 12, a luminance signal and a carrier chrominance signal are separated from the color video signal. Then, the separated luminance signal is frequency-modulated, and the separated carrier chrominance signal is frequency-converted into an unoccupied frequency band which is lower than a frequency band of the frequency modulated luminance signal. The frequency division multiplexed signal is obtained by frequency-division-multiplexing the frequency modulated luminance signal and the frequency converted carrier chrominance signal.

FIG. 2(A) shows an example of the frequency spectrum of the frequency division multiplexed signal, where a frequency spectrum I of the frequency modulated luminance signal has a carrier deviation band of 3.4 MHz to 4.4 MHz and a frequency spectrum II of the frequency converted carrier chrominance signal has a chrominance subcarrier frequency of 629 kHz. The frequency division multiplexed signal from the video block 12 is passed through a recording amplifier 13 and is separated into two signal paths. In other words, the frequency division multiplexed signal is passed through a rotary transformer 15 and is supplied to a video rotary magnetic head 17 on one hand, and the frequency division multiplexed signal is passed through a rotary transformer 16 and is supplied to a video rotary magnetic head 18 on the other.

On the other hand, a right-channel (R-channel) analog audio signal is applied to an input terminal 19R and a left-channel (L-channel) analog audio signal is applied to an input terminal 19L. The R-channel audio signal from the input terminal 19R is passed through a noise reduction circuit 20R and a lowpass filter 21R, and is supplied to a sample and hold (S/H) circuit 22R. The L-channel audio signal from the input terminal 19L is passed through a noise reduction circuit 20L and a lowpass filter 21L, and is supplied to a S/H circuit 22L. The noise reduction circuits 20R and 20L respectively employ the 2:1 logarithmic scale companding. The S/H circuits 22R and 22L respectively perform a sampling at a sampling frequency of 44.056 kHz, for example, and output sampled signals of the S/H circuits 22R and 22L are supplied to respective analog-to-digital (A/D) converters 23R and 23L which respectively convert the incoming signal into a PCM audio signal having a quantization number (level) of ten bits, for example. The output PCM audio signals of the A/D converters 23R and 23L are supplied to an encoder 24.

FIG. 3 shows an example of the construction of the encoder 24. In FIG. 3, the output PCM audio signals of the A/D converters 23R and 23L shown in FIG. 1 are applied to respective input terminals 36R and 36L and are supplied to a time division multiplexing circuit 37 wherein the sampling frequency is doubled and the PCM audio signals are alternately arranged in time-sequence to produce a time division multiplexed signal. The time division multiplexed signal is subjected to a non-linear quantization in a quantization number compressing circuit 38 and the quantization number of ten bits is compressed to a quantization number of eight bits. An output signal of the quantization number compressing circuit 38 is supplied to an error correction code generating circuit 39 wherein two kinds of error correction codes ECC such as codes P and Q are generated according to a known method.

Digital audio data (right and left channel PCM audio signals having the quantization number of eight bits) and the error correction codes obtained from the error correction code generating circuit 39 are supplied to an interleaving and time base compression circuit 40. As is well known, the interleaving and time base compression circuit 40 re-arranges the sequence of the data in order to improve the error correction and reproducing capability of the reproducing system against burst error and performs a time base compression so as to provide a signal blank interval. An output of the interleaving and time base compression circuit 40 is supplied to a cyclic redundancy check code (CRCC) adding circuit 41 wherein the cyclic redundancy check code CRCC is added as an error checking code. As is well known, the cyclic redundancy check code CRCC is a remainder which is obtained when the digital data constituting each block is divided by a predetermined generating polynomial.

The digital audio data, the error correction codes ECC and the error checking code CRCC are supplied to an adding circuit 42 and is added in time-sequence with a synchronizing signal generated from a synchronization pattern generator 43 and a pre-amble and a post-amble generated from a pre-amble and post-amble generator 44, and digital data in blocks are supplied to an output terminal 45. The synchronizing signal generated from the synchronization pattern generator 43 has a 12-bit fixed pattern.

FIG. 4 shows the signal format of the digital signal of one block. In FIG. 4, one block consists of 140 bits, and a synchronizing signal S having the 12-bit fixed pattern is arranged in the first to twelfth bits. Two channels of digital audio data are arranged in 96 bits from the thirteenth to 108-th bits. The two channels of digital audio data have quantization number of eight bits, and a total of six samples are alternately time-division-multiplexed for each channel. Out of remaining 32 bits, an 8-bit error correction code ECC is arranged in the first sixteen bits, and an 8-bit error checking code CRCC for detecting the error in the block is arranged in the latter sixteen bits. The digital signal of one block constituted by the digital audio data, the synchronizing signal, and the redundant bits such as the error correction codes and the error checking code is transmitted in two horizontal scanning periods (2 H, where H denotes one horizontal scanning period) avoiding a time period in which the switching of the rotary heads takes place, that is, avoiding seventeenth and eighteenth horizontal scanning periods corresponding to the vertical blanking period, for example.

A digital audio signal which is recorded on the magnetic tape by a first audio rotary magnetic head 32 which will be described later on in the present specification has a signal format shown in FIG. 5A for one track, for example. In FIG. 5A, a pre-amble is arranged in the first thirteen-and-a-half horizontal scanning periods (13.5 H) for reproducing a clock signal for data demodulation in the reproducing system. In the next 244 H, a total of 122 blocks of digital data each having the signal format shown in FIG. 4 are arranged in time-sequence. A post-amble is arranged in the remaining 5 H of the field, and this post-amble is used as a merging region for the switching of the rotary heads.

During the next field of the first rotary head 32, a second audio rotary magnetic head 33 which will be described later records a digital audio signal having a signal format shown in FIG. 5B for one track, for example. In FIG. 5B, a pre-amble is arranged in the first 13 H, and a total of 123 blocks of digital data are arranged in time-sequence in the next 246 H. A post-amble is arranged in the remaining 3.5 H of the field.

Accordingly, the digital audio signal having the signal format shown in FIG. 5A is recorded on one of two mutually adjacent tracks on the magnetic tape, and the digital audio signal having the signal format shown in FIG. 5B is recorded on the other of the two mutually adjacent tracks. A data blank interval amounting to 18 H consisting of the the post-amble of 5 H shown in FIG. 5A and the pre-amble of 13 H shown in FIG. 5B is recorded at a position which is approximately the same as the vertical blanking period position in the first field of the video signal. In addition, a data blank interval amounting to 17 H consisting of the post-amble of 3.5 H shown in FIG. 5B and the pre-amble of 13.5 H shown in FIG. 5A is recorded at a position which is approximately the same as the vertical blanking period position in the second field of the video signal.

The digital signal which has the signal format described before is obtained from the encoder 24 and is supplied to a serial-to-parallel (S/P) converter 25 shown in FIG. 1. The digital signal supplied to the S/P converter 25 is divided for every two bits and is supplied to a digital-to-analog (D/A) converter 26 in parallel in two bits.

The D/A converter 26 converts the incoming 2-bit parallel data into a 4-value (quaternary) analog signal shown in FIG. 6B, where the 4-value analog signal has four values in accordance with the bit combinations "00", "01", "11" and "10" of the 2-bit parallel data. The 4-value analog signal from the D/A converter 26 is supplied to a frequency modulator 27 which frequency-modulates a carrier by the 4-value analog signal. The frequency modulator 27 generates a 4-value frequency modulated (FM) signal. In other words, the S/P converter 25, the D/A converter 26 and the frequency modulator 27 constitute a 4-value frequency modulator.

For example, the carrier frequency is selected to 1.5 MHz. In addition, the transmission bit rate of the digital data is selected to $70f_H$ ($=1.101$ MHz) because one block (140 bits) is transmitted in 2 H as described before, where $f_H$ denotes the horizontal scanning period. As a result, the output 4-value FM signal of the frequency modulator 27 has a known frequency spectrum which looks like the teeth of a comb. In the frequency spectrum of the 4-value FM signal, a maximum level occurs at the carrier frequency of 1.5 MHz, a zero level occurs at frequency positions $\pm 550.5$ kHz ($=1101/2$ kHz) from 1.5 MHz and a zero level similarly occurs at frequency positions $\pm i \times 550.5$ kHz from 1.5 MHz, where $i$ is a natural number.

Accordingly, the 4-value FM signal from the frequency modulator 27 is passed through a bandpass filter 28 and is formed into a 4-value FM signal having a frequency spectrum shown in FIGS. 2(A) and 6A. The bandpass filter 28 eliminates the unwanted frequency component in the output 4-value FM signal of the frequency modulator 27. The width of the passband of the bandpass filter 28 is selected to approximately 0.7 times the transmission bit rate about the center frequency of 1.5 MHz so as not to generate inter-symbol interference. The output 4-value FM signal of the bandpass filter 28 is supplied to a recording amplifier 29. In the case where the transmission bit rate is small, it is possible to omit the bandpass filter 28. As may be seen from FIGS. 6A and 6B, the 4-value FM signal from the bandpass filter 28 has frequencies of 1.2 MHz, 1.4 MHz, 1.6 MHz and 1.8 MHz when the values of the digital data are "00", "01", "10" and "11", respectively.

The 4-value FM signal which is amplified in the amplifier 29 is supplied to the audio rotary head 32 via a rotary transformer 30 on one hand, and is supplied to the audio rotary head 33 via a rotary transformer 31 on the other. The video rotary heads (hereinafter simply referred to as video heads) 17 and 18 are mounted on a rotational plane of a rotary body (not shown) at mutually opposing positions, and the audio rotary heads (hereinafter simply referred to as audio heads) 32 and 33 are mounted on the rotational plane of the rotary body at mutually opposite positions leading the respective video heads 17 and 18 by a predetermined angle. For example, the video heads 17 and 18 have gaps with azimuth angles of $+6°$ and $-6°$, and the audio heads 32 and 33 have gaps with azimuth angles of $+30°$ and $-30°$. In addition, the track width of the audio heads 32 and 33 is set narrower than the track width of the video heads 17 and 18. As is well known, the magnetic tape is wrapped obliquely around the outer peripheral surface of the rotary body for an angular range over 180°.

Therefore, the 4-value FM signal having the frequency spectrum shown in FIG. 2(B) is recorded on a first audio track which is formed obliquely to the longitudinal direction of the magnetic tape with the signal format shown in FIG. 5A by the audio head 32. As the first audio track is being formed, the frequency division multiplexed signal amounting to one field and having the frequency spectrum shown in FIG. 2(A) is recorded on the way by the video head 17 on a first video track over the first audio track. Next, the 4-value FM signal is recorded on a second audio track with the signal format shown in FIG. 5B by the audio head 33. As the second audio track is being formed, the frequency division multiplexed signal amounting to the next one field is recorded on the way by the video head 18 on a second video track over the second audio track. Similarly thereafter, these operations are repeated.

Since the 4-value FM signal is a low-frequency signal as shown in FIG. 2(B), the 4-value FM signal is recorded at a deep portion of the magnetic layer of the magnetic tape. On the other hand, the FM luminance signal within the frequency division multiplexed signal is a high-frequency signal as may be seen from the frequency spectrum II in FIG. 2(A). The frequency converted carrier chrominance signal within the frequency division multiplexed signal is a low-frequency signal, however, since a non-saturated recording is carried out, the frequency division multiplexed signal of the FM luminance signal and the frequency converted carrier chrominance signal is only recorded at a surface portion of the magnetic layer. Thus, it is possible to form the audio and video tracks at the same position on the magnetic tape. This concept of respectively recording the two signals at the deep portion and the surface portion of the magnetic layer of the magnetic tape is known.

Next, description will be given with respect to the video and audio signal reproducing apparatus according to the present invention. FIG. 7 shows an embodiment of the reproducing apparatus according to the present invention. In FIG. 7, those parts which are the same as those corresponding parts in FIG. 1 are designated by the same reference numerals, and description thereof will be omitted. The frequency division multiplexed signal is alternately reproduced by the video heads 17 and 18 for each field. The reproduced frequency division multiplexed signal from the video head 17 is passed through the rotary transformer 15 and is supplied to a switching amplifier 50. The reproduced frequency division multiplexed signal from the video head 18 is passed through the rotary transformer 16 and is supplied to the switching amplifier 50. An output frequency division multiplexed signal of the switching amplifier 50 is passed through a pre-amplifier 51 and is supplied to a video block 52 wherein the signal is returned to the original color video signal by known means. The reproduced color video signal from the video block 52 is supplied to an output terminal 53.

On the other hand, the 4-value FM signal is alternately reproduced by the audio heads 32 and 33. The reproduced 4-value FM signal from the audio head 32 is passed through the rotary transformer 30 and a reproducing amplifier 54 and is supplied to a switching circuit 56. The reproduced 4-value FM signal from the audio head 33 is passed through the rotary transformer 31 and a reproducing amplifier 55 and is supplied to the switching circuit 56. An output 4-value FM signal of the switching circuit 56 is passed through a bandpass filter 57 and is supplied to a frequency demodulator 58 wherein the signal is frequency-demodulated into the 4-value analog signal shown in FIG. 6B. The 4-value analog signal is converted into a 2-bit digital data in an A/D converter 59 and is thereafter supplied to a parallel-to-serial (P/S) converter 60. The P/S converter 60 serially outputs each bit of the digital data. In other words, the A/D converter 59 and the P/S converter 60 constitute a 4-value frequency demodulator. The reproduced 4-value FM signal is demodulated in this 4-value frequency demodulator and is serially supplied in the block shown in FIG. 4 to a decoder 61 as a reproduced digital signal.

The decoder 61 has a construction shown in FIG. 8. In FIG. 8, the reproduced digital signal applied to an input terminal 70 is supplied to a synchronizing signal detector 71 wherein the synchronizing signal S arranged at the position shown in FIG. 4 is detected. The 128-bit digital signal consisting of the 96-bit digital audio data, the 16-bit error correction codes ECC and the 16-bit error checking code which follow the synchronizing signal S is supplied to an error detecting circuit 72 provided in a next stage. The digital signal is divided by a predetermined generating polynomial, and a remainder is used to check an error in the data constituting the same block. When there is no remainder, it is discriminated that there is no error and the digital audio data and the error correction codes ECC are supplied to a de-interleaving circuit 73. On the other hand, when there is a remainder, it is discriminated that there is an error and an error flag is supplied to the de-interleaving circuit 73 together with the digital audio data and the error correction codes ECC.

The de-interleaving circuit 73 comprises a memory circuit. The de-interleaving circuit 73 re-arranges the digital audio data and the error correction codes into the original sequence and performs a time base expansion so as to read out from the memory circuit digital audio data and error correction codes which are returned to the original time base. The time base deviation (jitter) generated during the recording and reproducing processes can be eliminated by writing input data into the memory circuit responsive to a first clock signal which includes the jitter and reading out the stored data from the memory circuit responsive to a second clock signal which has a predetermined frequency and includes no jitter.

The data obtained from the de-interleaving circuit 73 is supplied to an error correcting circuit 74 wherein the error in the digital audio data indicated by the error flag is corrected by use of the error correction codes ECC so as to restore the digital audio data. The correct digital audio data having no error indicated by the error flag is supplied as it is to the next stage.

A quantization number expanding circuit 75 expands the quantization number of eight bits of the digital audio data from the error correcting circuit 74 to a quantization number of ten bits. The digital audio data from the quantization number expanding circuit 75 having the quantization number of ten bits is serially supplied to a de-multiplexer 76. The de-multiplexer 76 receives data in which the right and left channel digital audio data are alternately arranged in time-sequence, and outputs in parallel the R-channel digital audio data and the L-channel digital audio data by setting the sampling frequency to 44.056 kHz which is one-half the sampling frequency. The R-channel digital audio data is passed through an output terminal 77R and is supplied to a D/A converter 62R shown in FIG. 7 wherein the R-channel digital audio data is converted into a reproduced R-channel audio signal, and the L-channel digital audio data is passed through an output terminal 77L and is supplied to a D/A converter 62L wherein the L-channel digital audio data is converted into a reproduced L-channel audio signal.

The reproduced R-channel audio signal from the D/A converter 62R is passed through a lowpass filter 63R and a noise reduction circuit 64R and is supplied to an output terminal 65R. The reproduced L-channel audio signal from the D/A converter 62L is passed through a lowpass filter 63L and a noise reduction circuit 64L and is supplied to an output terminal 65L. The noise reduction circuits 64R and 64L respectively perform the 2:1 logarithmic scale companding. Hence, compared to the case where an FM audio signal which is obtained by frequency-modulating the analog audio signal is recorded directly on the recording medium and reproduced, it is possible to obtain a reproduced audio signal of higher fidelity and higher quality.

The present invention is not limited to the embodiments described heretofore, and the modulation system of the audio signal may be other than that of the embodiments. For example, the modulation system may be an 8-value frequency modulation in which a carrier is frequency-modulated by an 8-value analog signal which is obtained by supplying digital data (PCM signal) to a D/A converter for every three bits. In principle, it is also possible to use multiple-value frequency modulation over the 3-value (ternary) frequency modulation in addition to the 4-value and 8-value frequency modulations.

The 8-value FM signal can be transmitted within a narrow frequency band compared to the 4-value FM signal, but it is difficult to obtain in the general VTR a dynamic range that enables discrimination of each of the eight values at the time of the demodulation. On the other hand, the 3-value FM signal requires a complex circuit. Accordingly, the 4-value FM signal is most suited for the recording and/or reproduction on the VTR having the narrow recording and reproducing frequency band.

The constitution of one block is not limited to the signal format shown in FIG. 4. For example, when the redundant bits such as the error correction codes and the error checking code are omitted, it is possible to record and reproduce the digital audio data by employing the 14-to-10 quasi-instantaneous companding.

It is of course possible to record and reproduce the 4-value FM signal together with the frequency division multiplexed signal of the FM luminance signal and the frequency converted carrier chrominance signal on the same tracks by use of the same rotary heads, by frequency-division-multiplexing the 4-value FM signal with the frequency division multiplexed signal. However, in this case, it is necessary to appropriately select the carrier frequency of the FM luminance signal.

Further, the present invention is not limited to these embodiments, but various variations and modifications may be made without departing from the scope of the present invention.

What is claimed is:

1. A video and audio signal recording apparatus comprising:
   a video block for producing from an input video signal a frequency division multiplexed signal in which a frequency modulated luminance signal and a frequency converted carrier chrominance signal are frequency-division-multiplexed, said frequency converted carrier chrominance signal having been frequency-converted into a frequency band lower than that of said frequency modulated luminance signal;
   digital audio signal producing means for obtaining digital audio data by pulse code modulating an input analog audio signal and for producing a digital audio signal which is a time-sequence of blocks each having said digital audio data and redundant bits added thereto;
   modulating means for obtaining an n-value analog signal by subjecting said digital audio signal to a serial-to-parallel conversion and thereafter to a digital-to-analog conversion and for generating an n-value frequency modulated signal having said n-value analog signal as a modulating signal thereof, where n is an integer greater than or equal to three; and
   recording means comprising rotary magnetic heads for recording said n-value frequency modulated signal and said frequency division multiplexed signal on a magnetic recording medium.

2. A video and audio signal recording apparatus as claimed in claim 1 in which said recording means comprises independent rotary heads for independently recording said n-value frequency modulated signal at a deep portion of a magnetic layer of said magnetic recording medium and said frequency division multiplexed signal at a surface portion of the magnetic layer of said magnetic recording medium.

3. A video and audio signal recording apparatus as claimed in claim 1 in which said recording means comprises common rotary heads for recording both said n-value frequency modulated signal and said frequency division multiplexed signal on said magnetic recording medium.

4. A video and audio signal recording apparatus as claimed in claim 1 in which said modulating means comprises a serial-to-parallel converter for outputting said digital audio signal which is supplied serially thereto as parallel data for every two bits, a digital-to-analog converter for converting a 2-bit parallel output of said serial-to-parallel converter into a 4-value analog signal, and a frequency modulator for generating a 4-value frequency modulated signal by frequency-modulating a carrier by the 4-value analog signal from said digital-to-analog converter.

5. A video and audio signal recording apparatus as claimed in claim 1 which further comprises a bandpass filter supplied with said n-value frequency modulated signal for supplying a filtered output thereof to said recording means, said bandpass filter having a passband of a width which is approximately 0.7 times a transmission bit rate of said digital audio signal about a carrier frequency of said n-value frequency modulated signal.

6. A video and audio signal recording and reproducing apparatus comprising:
a first video block for producing from an input video signal a frequency division multiplexed signal in which a frequency modulated luminance signal and a frequency converted carrier chrominance signal are frequency-division-multiplexed, said frequency converted carrier chrominance signal having been frequency-converted into a frequency band lower than that of said frequency modulated luminance signal;
digital audio signal producing means for obtaining digital audio data by pulse code modulating an input analog audio signal and for producing a digital audio signal which is a time-sequence of blocks each having said digital audio data and redundant bits added thereto;
modulating means for obtaining an n-value analog signal by subjecting said digital audio signal to a serial-to-parallel conversion and thereafter to a digital-to-analog conversion and for generating an n-value frequency modulated signal having said n-value analog signal as a modulating signal thereof, where n is an integer greater than or equal to three;
recording and reproducing means comprising rotary magnetic heads for recording said n-value frequency modulated signal and said frequency division multiplexed signal on a magnetic recording medium and for reproducing said n-value frequency modulated signal and said frequency division multiplexed signal from said magnetic recording medium;
first demodulating means for obtaining said n-value analog signal from said n-value frequency modulated signal reproduced by said recording and reproducing means;
second demodulating means for obtaining said digital audio signal by subjecting said n-value analog signal from said first demodulating means to an analog-to-digital conversion so as to obtain a digital signal having a plurality of bits and then to a parallel-to-serial conversion;
decoder means for obtaining the original input analog audio signal from said digital audio signal obtained from said second demodulating means; and
a second video block for producing the original input video signal from said frequency division multiplexed signal reproduced by said recording and reproducing means.

7. A video and audio signal recording and reproducing apparatus as claimed in claim 6 in which said recording and reproducing means comprises independent rotary heads for independently recording and reproducing said n-value frequency modulated signal at a deep portion of a magnetic layer of said magnetic recording medium and said frequency division multiplexed signal at a surface portion of the magnetic layer of said magnetic recording medium.

8. A video and audio signal recording and reproducing apparatus as claimed in claim 6 in which said recording and reproducing means comprises common rotary heads for recording and reproducing both said n-value frequency modulated signal and said frequency division multiplexed signal on said magnetic recording medium.

9. A video and audio signal recording and reproducing apparatus as claimed in claim 6 in which said modulating means comprises a serial-to-parallel converter for outputting said digital audio signal which is supplied serially thereto as parallel data for every two bits, a digital-to-analog converter for converting a 2-bit parallel output of said serial-to-parallel converter into a 4-value analog signal, and a frequency modulator for generating a 4-value frequency modulated signal by frequency-modulating a carrier by the 4-value analog signal from said digital-to-analog converter.

10. A video and audio signal recording and reproducing apparatus as claimed in claim 6 which further comprises a bandpass filter supplied with said n-value frequency modulated signal from said modulating means for supplying a filtered output thereof to said recording and reproducing means, said bandpass filter having a passband of a width which is approximately 0.7 times a transmission bit rate of said digital audio signal about a carrier frequency of said n-value frequency modulated signal.

11. A video and audio signal recording and reproducing apparatus as claimed in claim 6 in which said second demodulating means comprises an analog-to-digital converter for converting a 4-value analog signal from said first demodulating means into a parallel 2-bit digital signal, and a parallel-to-serial converter for converting said 2-bit digital signal into said digital audio signal by performing a parallel-to-serial conversion.

* * * * *